United States Patent [19]
Brookes

[11] 3,981,427
[45] Sept. 21, 1976

[54] METHOD OF LAMINATING GRAPHITE SHEETS TO A METAL SUBSTRATE

[76] Inventor: Ronald R. Brookes, 303 Cordelia Ave. SW., North Canton, Ohio 44720

[22] Filed: Apr. 28, 1975

[21] Appl. No.: 572,319

[52] U.S. Cl. .............................. 228/122; 228/193; 228/263
[51] Int. Cl.² .................. B23K 31/02; B23K 19/00; B23K 35/22
[58] Field of Search ........... 228/122, 263, 903, 193, 228/194, 195

[56] References Cited
UNITED STATES PATENTS

| | | | |
|---|---|---|---|
| 2,431,975 | 12/1947 | Yockey et al. | 228/903 X |
| 3,883,946 | 5/1975 | Dale | 228/121 |
| 3,903,585 | 9/1975 | Kosteruk et al. | 228/263 X |
| 3,911,553 | 10/1975 | Burgess et al. | 228/195 X |
| 3,935,986 | 2/1976 | Lattari et al. | 228/194 X |

*Primary Examiner*—Al Lawrence Smith
*Assistant Examiner*—Margaret Joyce
*Attorney, Agent, or Firm*—Frease & Bishop

[57] ABSTRACT

A method for bonding graphite sheets to a metallic substrate. The metallic substrate is provided with a coating of low melt metal which forms an intermetallic phase or zone at the interface between the substrate and coating. The coated substrate while in solidified condition is placed in a press between a pair of graphite sheets. Heat is applied to the substrate and graphite sheets while under pressure to a temperature slightly above the melting point of the substrate coating but below the temperature which will destroy the intermetallic interface. The substrate and graphite sheets are cooled while maintained under pressure in the press with the graphite sheets becoming firmly bonded to the metallic substrate by the resolidified metal coating.

11 Claims, 7 Drawing Figures

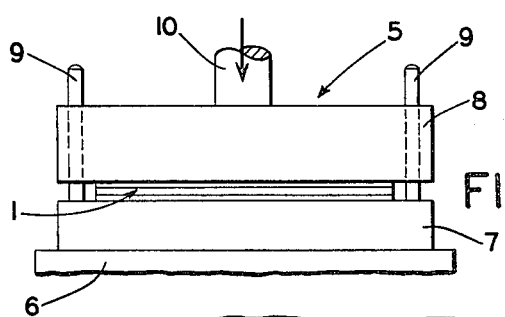
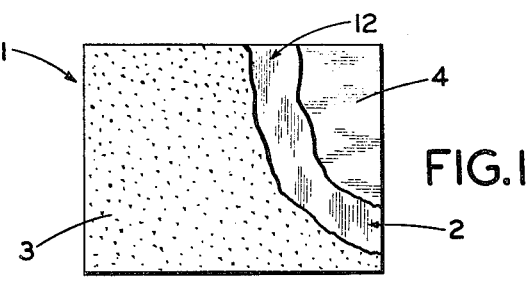
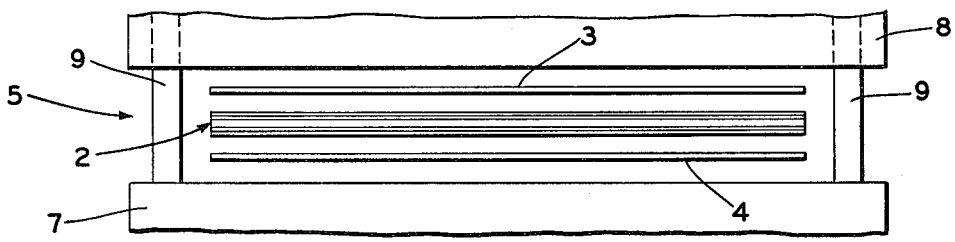
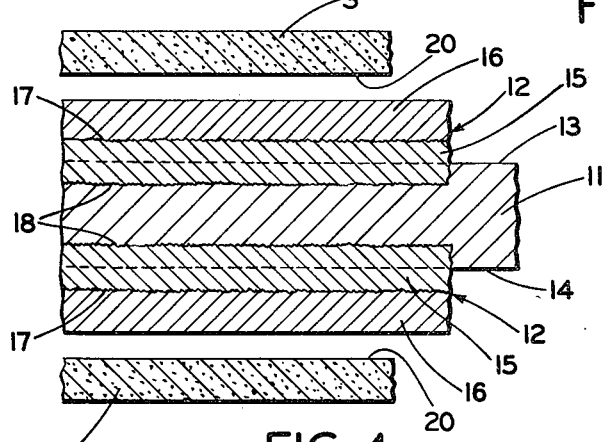
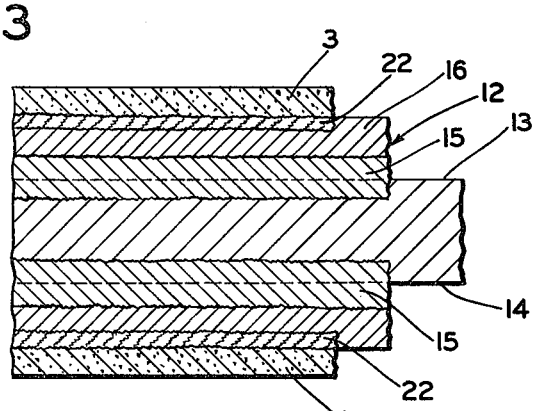
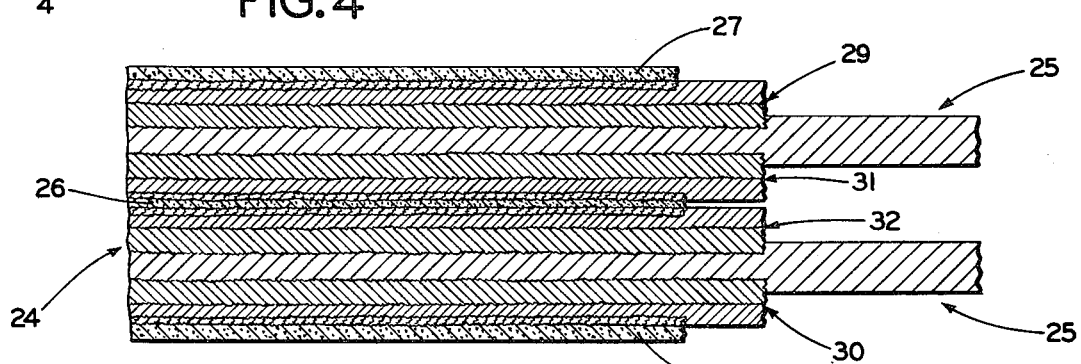
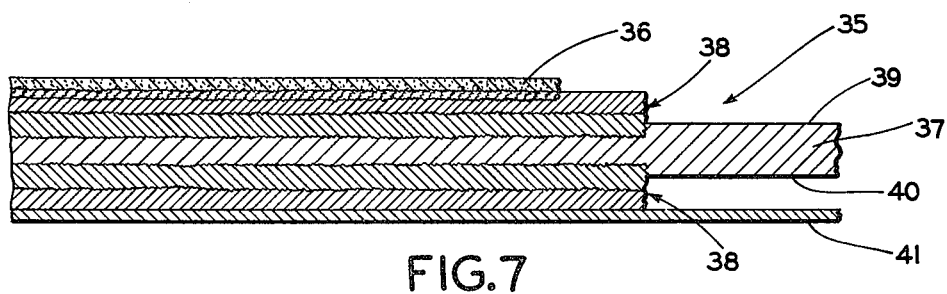

METHOD OF LAMINATING GRAPHITE SHEETS TO A METAL SUBSTRATE

BACKGROUND OF THE INVENTION

1. Field of the Invention

The invention relates to a method of laminating a plurality of sheets to a metallic substrate. More particularly, the invention relates to a method of laminating graphite sheets to a metallic substrate by use of a low melt metal coating applied to the metallic substrate as the means or adhesive for bonding the graphite sheets to the substrate to form a composite laminate.

2. Description of the Prior Art

Numerous types of inventions and procedures have been devised for securing together sheets of various materials to form a composite laminate. Most of these methods involve the applying of an organic adhesive to the substrate which serves as the bonding agent between the laminations. Various heating, cooling and pressure procedures and equipment for carrying out the such methods have been used, many of which are quite elaborate and expensive.

The use of organic adhesive type materials have proved satisfactory for most applications. However, difficulties have arisen when the laminated structure is used in an application in which it is subjected to high temperatures and various chemical solutions which destroy the adhesive bond between the substrate and attached sheets.

For example, problems have been encountered in the formation of laminated products, such as gaskets, for use in internal combustion engines which must withstand prolonged temperatures up to 400°F and are subjected to Ethylene Glycol solutions for sustained periods of time from the engine coolant system. The use of known organic adhesives have proved unsatisfactory for such applications because of the sustained high temperatures, and/or harmful and destructive reactions with the Ethylene Glycol solution.

Likewise, many installations such as in internal combustion engines, furnaces, hot metal working procedures, refractories, heat exchanges, solar energy collecting panels, etc. have the need of laminated structures permitting the rapid transfer or conduction of heat therethrough. The use of organic adhesives, even if able to withstand the high temperatures encountered, act as an insulation to the transfer of heat through the laminate and prove unsatisfactory.

Also, laminated structures used for many applications have an asbestos or heat resistant material as the outer layers, which in turn is bonded to a metallic substrate. Such heat resistant material makes it extremely difficult to form multilayered laminated structure when the application of heat is required for the setting or bonding of the adhesive, since the heat is unable to penetrate satisfactorily through the heat resistant material to the innermost layer. This has necessitated the use of an organic adhesive not requiring heat for bonding, which proves unsuccessful for some applications.

Thus, a need exists for a method of forming laminated structures having a metallic substrate for strength, and heat conductive outer sheets, which sheets are bonded to the metallic substrate by use of a non-organic adhesive able to withstand high temperatures and many corrosive solutions.

It has been found that the use of graphite sheets when bonded to a metal substrate which have been coated with a lower melt metal, by using a portion of the substrate metal coating as the bonding agent or adhesive, provides a laminated structure suitable for such applications. Such a lamination provides a construction able to withstand high temperatures for long periods of time and rapidly conducts heat through the lamination, and is unaffected by many chemical solutions.

A known method of making a laminated structure having a metallic substrate which uses metal as the bonding agent instead of the above described and heretofore used organic adhesives, is shown in U.S. Pat. No. 2,188,721. The method described in this patent appears to provide a satisfactory solution in providing the type of laminated structures of the specified materials.

Methods such as shown in U.S. Pat. No. 2,188,721 use asbestos sheets or other types of heat insulating materials which are fed continuously from a roll of such material. These methods require spray chambers and hot dip metal coating facilities, all of which are expensive and require considerable space and facilities, in order to carry out the steps of such procedures.

U.S. Pat. No. 2,073,334 discloses another method whereby webs of asbestos are applied to a running strip of metal substrate, in which an interposed layer of metal functions as the adhesive. Again the described method requires that a hot strip coating facility be located adjacent the laminating facility so that the asbestos strip is applied to the substrate while the metal coating on the substrate is still in a molten or liquified state, immediately after passage of the substrate through the metal bath and prior to solidification on the substrate. Thus, again considerable expense, equipment, space and procedures are required to carry out the steps of such a laminating method.

There has long been a need existing in the art for some means of eliminating the expense and complicated procedures for forming laminated structures using metal as the adhesive, in order to overcome the problems encountered with organic type adhesives and insulation sheets.

SUMMARY OF THE INVENTION

Objectives of the invention include providing a new method or procedure for laminating sheets of heat conductive materials, preferably graphite sheets, to a metal substrate coated with a low melt metal eliminating the use of organic adhesives; providing such a laminating method requiring only a heated press for carrying out the step of the new method, which press need supply only a relatively small amount of pressure as compared to high pressure presses heretofore required for many laminating procedures; providng such a new laminating method in which the coated metal substrate preferably is coated at a location remote from the laminating facilities and is in a solidified or "cold" state permitting easy handling, manipulation and storage thereof; providing such a new laminating method in which the substrate and laminating sheets can have various configurations and shapes preformed therein prior to assembly and lamination thereof; and providing a new method of laminating graphite sheets to a metal substrate which eliminates difficulties heretofore encountered, achieves the new objectives indicated in a simple, effective and inexpensive manner and solves problems and satisfies needs long existing in the art of lamination.

These objectives and advantages are obtained by the improved method of laminating graphite sheets to a metal substrate, including the steps of providing a sheet of metallic substrate having a solidified coat of a low melt metal on at least one side thereof which has formed an intermetallic zone with the substrate, and with the metallic substrate having a considerably higher melting temperature than the metal coat; placing a graphite sheet in contact with the coated side of the metallic substrate; applying pressure to the graphite sheet and coated metallic substrate in a press; heating the graphite sheet and metallic substrate while under pressure to a temperature slightly higher than the melting temperature of the metal coat and less than a temperature which will destroy the intermetallic zone between the substrate and metal coating partially liquifying the outer portion of the metal coating in contact with the graphite sheet; and cooling the graphite sheet and metallic substrate to below the melting point of the metal coating while under pressure in the press with said graphite sheet being bonded to the metallic substrate by the metal coating.

BRIEF DESCRIPTION OF THE DRAWINGS

Preferred method steps of the invention — illustrative of the best mode in which applicant has contemplated applying the principles — are illustrated somewhat diagrammatically in the drawings and set forth in the following description, and are particularly and distinctly pointed out and set forth in the appended claims.

FIG. 1 is a top plan view with portions broken away showing the preferred laminated construction produced by the improved method;

FIG. 2 is a diagrammatic side elevational view of a press, shown in closed position, carrying out steps of the invention;

FIG. 3 is an enlarged fragmentary plan view of the press shown in FIG. 2 in open position, with a sheet of coated metallic substrate and a pair of graphite sheets which form the laminated construction of FIG. 1, being shown in separated condition;

FIG. 4 is a fragmentary extremely enlarged sectional view showing the assembly of the sheets of the laminated structure in carrying out the steps of the improved method prior to the applying of heat and pressure thereto;

FIG. 5 is a fragmentary extremely enlarged sectional view similar to FIG. 4 showing the bonding of the graphite sheets to the metallic substrate upon applying pressure and heat;

FIG. 6 is a sectional view somewhat similar to FIG. 5 showing another type of laminated structure produced by the improved method; and FIG. 7 is a sectional view similar to FIGS. 5 and 6 showing still another laminated structure produced by the improved method.

Similar numerals refer to similar parts throughout the drawings.

DESCRIPTION OF THE PREFERRED STEPS OF THE METHOD

The new method involves the use of a press to carry out the improved procedure of laminating graphite sheets to a metallic substrate. The press can be of a usual construction and is shown diagrammatically in FIG. 2. The preferred laminate formed by the new method of the invention is shown in FIG. 1 and is indicated generally at 1. Laminate 1 includes a coated metallic substrate 2 imposed between top and bottom layers of graphite sheets 3 and 4.

A type of press for carrying out the steps of the invention is indicated generally at 5 (FIG. 2), and consists of a base 6, a lower press plate 7 and an upper press plate 8. Upper plate 8 is slidably mounted on slide rods 9 and may be moved by a piston rod 10 or other control means.

In accordance with the invention, substrate 2 includes a metallic sheet 11, usually of steel or copper alloy which is provided with a coating of a relatively low melt metal 12, such as tin, zinc or aluminum, or alloys thereof, preferably on both side surfaces 13 and 14 of substrate sheet 11 (FIG. 4). The coating 12 preferably is applied to substrate sheet 11 by usual hot dip coating procedures well known in the art in which a coil of sheet steel is passed through a bath of the molten coating metal. The thickness of the coat is controlled by air knifes, wiper blades or other control means.

During this coating procedure, the coating metal 12 (assume tin for purposes of discussion and illustration) upon solidifying, forms an intermetallic phase or zone 15 (FIG. 4) at the steel-to-tin interface, which provides the bond between the coating metal 12 (tin) and substrate metal 11 (steel). Furthermore, intermetallic zone 15 provides a liquidus temperature gradient from the steel substrate 11 to the tin coating 12. For example, the outermost zone or thickness of tin, indicated at 16, has a melting point of approximately 480°F with the tin-to-steel interface zone 15 having a melting range of approximately 600° to 800°F progressing inwardly from an imaginary surface line 17 to an imaginary surface line 18.

Substrate 11 can have a wide range of melting temperatures depending upon the types of steel or metal used for the substrate, all of which are considerably higher than the melting point of the coating and outer thicknesses of the intermetallic zone 15.

One of the advantages of the improved method is that the thickness of coating metal 12 can vary appreciably without affecting the bonding of the laminate construction 1. It is only necessary that the coating thickness be suitable to allow sufficient lower liquidus temperature tin at surface zone 16 than at the intermetallic zone 15.

The next step of the method includes the placing of the pair of graphite sheets 3 and 4 adjacent to the coated surfaces of substrate 11 in press 5 between lower and upper press plates 7 and 8 (FIG. 3). Graphite sheets 3 and 4 preferably are of the type described in U.S. Pat. No. 3,404,061, sold under the trademark, GRAFOIL by Union Carbide Corporation. Such graphite sheets are good conductors of heat and enable the laminated construction to be used in many applications where rapid transfer of heat is desired and necessary. This is in contrast to the type of laminated construction of U.S. Pat. No. 2,073,334 and 2,188,721 which uses outer lamination layers of asbestos.

Upper press plate 8 then is lowered from the open position of FIG. 3 to the closed position of FIG. 2 to apply and maintain pressure on the assembled coated substrate and graphite sheets 2 and 3–4. The temperature of press 5 is raised (or if preheated is maintained) to a temperature slightly above the melting point of the coating metal 12, for example, approximately 500°F for tin coating 12. This temperature is maintained for a sufficient period of time necessary to melt the outermost portion of the layer or zone 16 of the tin coating 12 (FIG. 5) to form a semi-solid or liquidus layer of tin.

The applied temperature is not high enough to affect the intermetallic zone 15 between the tin and steel which has a melting point of approximately 600° – 800°F.

The pressure exerted by press 5 forces graphite sheets 2 and 3 against the semi-solid or liquidus layer of tin forcing the tin into voids in the adjacent surfaces 20 of the graphite sheets, even though the voids might be extremely small.

Another advantage of the improved method is that it has been discovered that only a relatively minimum or small amount of pressure is required (in contrast to known laminating methods) to achieve sufficient penetration of the tin into the graphite sheets. Pressure as low as 25 lbs/sq. in. has been found to be quite satisfactory, thus eliminating the need of expensive, high tonnage presses.

In the final steps of the improved method, the pressed sheets of graphite and coated metal substrate are cooled while maintained under pressure, either in press 5 or a secondary press, until the temperature drops below the melting point of the coating metal 12 or 480°F for tin. The portion of coating zone 16, indicated at 22, FIG. 5, which has penetrated into sheets 3 and 4, resolidifies firmly bonding the graphite sheets to coated substrate 2 by use of the metal coating as the bonding agent or adhesive. Such a metal bond is unaffected by many chemical solutions, and is able to withstand temperatures up to below 480°F, not possible with most organic adhesives.

Because of the nature of graphite sheets (in particular the graphite sheets produced in accordance with U.S. Pat. No. 3,404,061) since the adhesive can by itself be prepared to withstand temperatures in the order of and up to 800°F for tin and zinc alloys and even 1100°F for aluminum alloys, the laminate can withstand impingement temperatures in excess of 1500°F due to the lateral dissipation of heat by the graphite sheets.

Another advantage of the improved method is the ability to form a laminated construction 24 having a plurality of coated metallic substrates 25 with a sheet 26 of graphite interposed therebetween, as shown in FIG. 6. Such a laminated construction is possible due to the high thermal conductivity of the upper and lower graphite sheets 27 and 28. Heat, when applied to the top and/or bottom graphite sheets 27 and 28 of multilayered construction 24 will be transmitted rapidly through sheets 27 and 28 and adjacent intermetallic zones 29 and 30, and then through coated substrates 25 to the innermost intermetallic zones 31 and 32 adjacent middle graphite sheet 26. Maintaining the temperature above the melting point of the tin and below the melting point of the intermetallic zones (while under pressure) for a sufficient period of time to form layers of liquid metal adjacent the graphite sheets, will securely bond together the layers of the multilayered laminated construction 24, after the stacked sheets are cooled below 480°F.

Use of this method is not suitable for forming known laminations of asbestos or other insulating types of material since the heat could not satisfactorily penetrate the asbestos sheets without melting and damaging the intermetallic zones in order to heat the layers of tin adjacent the innermost asbestos sheet. Furthermore, the stacking of a plurality of alternating sheets of coated metal substrates between sheets of asbestos or graphite and the like would be considerably difficult by heretofore known methods using continuous moving strips of materials fed from supply reels, unless the metal coating has been solidified.

FIG. 7 shows another slightly modified form of the invention which produces a laminated construction, indicated at 35, in which a graphite sheet 36 is attached to only one side of a metal substrate 37, having a coat of low melt metal 38 on both surfaces 39 and 40 of substrate 37. Sheet metal strips preferably are coated on both sides to completely protect the base metal and are readily commercially available and because it is usually added expense and more difficult to coat only one side of the substrate with molten metal.

The steps of this modified form of the invention are similar to the steps described above for the construction of FIGS. 1–5, except that one of the sheets of graphite is replaced by a sheet of material (such as aluminum) indicated at 41 to which tin or the particular metal coating used will not adhere. Likewise, the surface of one of the press plates can be coated with a material unaffected by the semi-solid or liquified top portion of tin coating when heated. Thus, a single sheet of graphite 36 can be bonded simply and inexpensively, to a metallic substrate coated on both sides without affecting the opposite side of the substrate, since the metal coating 38 adjacent material 41, will solidify to its former condition upon cooling of the laminated construction without adhering to sheet 41. Likewise, a second coated metallic substrate can be bonded to graphite sheet 36 (FIG. 7) forming a laminated structure of a sheet of graphite sandwiched between a pair of coated metal substrates.

The improved method thus provides a procedure for laminating one or more graphite sheets to coated metal substrates inexpensively and simply and with a minimum of equipment. One of the important features of the improved method is the ability to use a substrate which has been coated at a location remote from the location at which the lamination steps are performed. This enables coils of coated sheet metal to be obtained from various sources and stored until needed, eliminating the requirement of expensive hot dip coating facilities adjacent to the presses, as required with prior methods.

The improved method provides a procedure for forming multiple layers of alternating sheets of coated substrate and graphite sheets due to the excellent heat transfer and conductive characteristics of the graphite sheets. The final laminating steps can have various patterns, which patterns can be pre-cut into the coated substrates and graphite sheets prior to assembly and placement of the stacked sheets in the bonding press.

Although the above method is described with respect to a tin coated steel sheet substrate, other low melt metal coatings can be applied to various substrates so long as the intermetallic zone formed between the substrate and coating metal has a higher melting temperature than that of the metal coating, for example a higher melting tin alloy coating on a copper or brass substrate, and a zinc alloy coating on steel substrate.

The present invention thus provides an improved method of molding laminated sheets which achieves the stated objectives, eliminates difficulties which have characterized prior art laminating procedures using organic adhesives and insulating type materials, and solves problems that have long existed in the art.

In the foregoing description, certain terms have been used for brevity, clearness and understanding but no unnecessary limitations are to be implied therefrom beyond the requirements of the prior art because such terms are used for descriptive purposes herein and are intended to be broadly construed.

Moreover, the description and illustration of the invention is by way of example and the scope of the present invention is not limited to the exact details of the construction.

Having now described the features, discoveries and principles of the invention, the manner in which the improved method of laminating graphite sheets to a metal substrate is carried out, the characteristics of the new concept, and the advantageous, new and useful results obtained; the new and useful methods, steps, and procedures are set forth in the appended claims.

I claim:

1. The method of coating sheet steel base material with graphite, which includes the steps of providing a steel sheet having an intermetallic phase bonded tin coating on at least one side of the steel base; placing a graphite sheet on the tin coated side of the steel base sheet to form a sandwich pack; pressing the tin coated and graphite sheets of the pack together while conductively heating the pack to a temperature slightly higher than the melting point of tin penetrating the graphite sheet with liquidus tin resulting from the heating, while maintaining the heated pack under pressure; and then cooling the sandwich pack under pressure to solidify the liquidus tin to form a bond between the graphite sheet and the tin coating on the steel base material.

2. The method set forth in claim 1 including the steps of providing the steel base sheet with a tin coating on both sides of the sheet; and then placing graphite sheets in contact with both coated sides of the steel sheet to form a sandwich pack having a steel base sheet interposed between and bonded to a pair of graphite sheets upon cooling of the sandwich pack.

3. The method set forth in claim 2 including the steps of providing a second steel sheet of base material having an intermetallic phase bonded tin coating on both sides of the steel base; placing one side of the second steel sheet in contact with one of the graphite sheets; and then placing a third graphite sheet in contact with the other side of the second steel sheet to form a multiple layered sandwich pack upon cooling of the sandwich pack.

4. The method set forth in claim 1 in which the sandwich pack is heated to a temperature in the range of 480° to 600°F while being maintained under pressure.

5. The method set forth in claim 1 including pressing the sandwich pack at a low pressure having a minimum pressure of approximately 25 lbs./sq. in.

6. The method of coating a sheet of base material selected from the group consisting of copper, brass and steel with graphite, which includes the steps of providing a sheet of said base material having an intermetallic phase bonded coating selected from the group consisting of tin, zinc and aluminum on at least one side of the base material sheet; placing a graphite sheet on the coated side of the sheet of base material to form a sandwich pack; pressing the coated and graphite sheets of the pack together while conductively heating the pack to a temperature slightly higher than the melting point of the coating; penetrating the graphite sheet with liquidus coating resulting from the heating, while maintaining the heated pack under pressure; and then cooling the sandwich pack while maintained under pressure to solidify the liquidus coating to form a bond between the graphite sheet and the coating on the sheet of base material.

7. The method set forth in claim 6 in which the base material is steel and the metal coating is tin; and in which the sandwich pack is heated to a temperature in the range of 480° to 600°F.

8. A method of laminating a graphite sheet to a metallic substrate including the steps of providing a sheet of metallic substrate having a solidified coat of a low melt metal on at least one side thereof bonded by an intermetallic zone with the substrate, and in which the metallic substrate has a considerably higher melting temperature than that of said metal coat; placing a graphite sheet in contact with the coated side of the metallic substrate; applying pressure to the graphite sheet and coated metallic substrate; conductively heating the graphite sheet and metallic substrate while under pressure and in the presence of air to a temperature higher than the melting temperature of the metal coat and less than a temperature which will affect the bond of the intermetallic zone between the substrate and metal coat, partially liquifying the outer portion of the metal coat in contact with the graphite sheet; penetrating the graphite sheet with liquidus metal of the metal coat resulting from the heating, while maintaining the heated graphite and metallic substrate sheets under pressure; and then cooling the graphite and metallic substrate sheets to below the melting point of the metal coat while maintained under pressure and in the presence of air to solidify the liquidus metal to form a bond between the graphite sheet and the metal coat on the metallic substrate.

9. The method set forth in claim 8 in which the metallic substrate is selected from the group consisting of copper, brass and steel; and in which the metal coat is selected from the group consisting of tin, zinc and aluminum.

10. The mold set forth in claim 9 in which the metallic substrate is steel and the metal coat is tin; in which the contacting graphite and metallic substrate sheets are heated to a temperature in the range of 480° to 600°F and with a pressure as low as 25 lbs./sq. in.

11. The method set forth in claim 8 including the steps of providing the metallic substrate with a solidified coat of a low melt metal on both sides thereof bonded by intermetallic zones with the metallic substrate; and then placing graphite sheets in contact with both coated sides of the metallic substrate to form a laminate consisting of a metallic substrate bonded to and located between a pair of graphite sheets upon cooling of the graphite sheets and metallic substrate.

* * * * *